United States Patent [19]

Schminke et al.

[11] 3,903,075

[45] Sept. 2, 1975

[54] PROCESS FOR THE PREPARATION OF WATER-INSOLUBLE HYDROXYBUTYL CELLULOSE

[75] Inventors: Wolfgang Schminke; Hans Macholdt, both of Wiesbaden-Biebrich, Germany

[73] Assignee: Hoechst Aktiengesellschaft, Germany

[22] Filed: June 7, 1971

[21] Appl. No.: 150,749

Related U.S. Application Data

[63] Continuation of Ser. No. 785,788, Dec. 20, 1968, abandoned.

[30] Foreign Application Priority Data

Dec. 22, 1967 Germany.......................... 1668349

[52] U.S. Cl........... 260/231 R; 260/231 A; 260/232
[51] Int. Cl................................................ C08b 11/02
[58] Field of Search................. 260/231, 231 A, 232

[56] References Cited
UNITED STATES PATENTS
2,053,768   9/1936   Dreyfus............................. 260/231
3,131,176   4/1964   Klug................................... 260/231
3,131,177   4/1964   Klug et al. ......................... 260/231
3,251,825   5/1966   Haidasch et al. .................. 260/231

OTHER PUBLICATIONS

Condensed Chemical Dictionary, 5th ed., 1956, Reinhold Publ. Co., N.Y., pp. 513 and 651.

*Primary Examiner*—Melvyn I. Marquis
*Attorney, Agent, or Firm*—James E. Bryan, Esq.

[57] ABSTRACT

This invention relates to a process for the preparation of hydroxybutyl cellulose which comprises etherifying alkali cellulose with butylene oxide in a quantity corresponding to at least four times the weight of cellulose present in the form of alkali cellulose, at a temperature of at least 60°C., continuing the reaction until at least 0.7 mole of butylene oxide per glucose unit has been used for substitution on the cellulose and washing the reaction product with water.

1 Claim, No Drawings

PROCESS FOR THE PREPARATION OF WATER-INSOLUBLE HYDROXYBUTYL CELLULOSE

This application is a continuation of Ser. No. 785,788, filed Dec. 20, 1968 and now abandoned.

This invention relates to a process for the preparation of waterinsoluble hydroxybutyl cellulose, in particular of thermoplastic waterinsoluble hydroxybutyl cellulose.

It is known that cellulose hydroxyalkyl ethers can be prepared by reacting alkali cellulose with alkylene oxides. For industrial purposes, this etherification method is mainly employed for the preparation of hydroxyethyl cellulose and of mixed ethers of hydroxyethyl cellulose. Further, it is known to prepare hydroxy propyl cellulose by this method. At a high degree of molecular substitution (M.S.), these cellulose ethers are thermoplastic and soluble in water.

The expression "molecular substitution (M.S.)" as used in this context refers to the average number of moles of alkylene oxide used per glucose unit for substitution on the cellulose. In the case of etherification with alkylene oxides, the degree of molecular substitution (M.S.) is not identical with the average degree of substitution (D.S.), which states the average number of OH groups etherified per glucose unit, because during etherification with alkylene oxides substitution with hydroxyalkyl groups may take place also on hydroxyalkyl groups already substituted on the cellulose.

Further, it is known that alkali cellulose may be etherified by means of butylene oxide, but so far this reaction has been practiced only up to minor etherification reactions and in combination with further modifications of the cellulose molecule which were effected either simultaneously or thereafter. Heretofore, no etherification reactions were conducted between alkali cellulose and alkylene oxides of higher molecular weights than propylene oxide. Actually, there was no reason to perform such reactions, because it could not be expected that they would result in a technical effect which could not be achieved with the less expensive and more reactive alkylene oxides of lower molecular weight, such as ethylene oxide and propylene oxide.

The present invention provides a process for the preparation of a cellulose ether in which the ether is washed with water. The cellulose ether thus produced preferably should be thermoplastic. Surprisingly, it was found that such a process can be successfully performed when butylene oxide is employed in a special manner for etherification.

The process of the invention is based on the known process for the preparation of hydroxy butyl cellulose, by etherifying alkali cellulose with butylene oxide in a pressure vessel, if desired in the presence of water-soluble or water-insoluble organic solvents, and, for etherification, butylene oxide is charged into the pressure vessel in a quantity which corresponds to at least 4 times the weight of the cellulose present in the form of alkali cellulose, etherification is effected at a temperature of at least 60° C. and is continued until at least 0.7 mole of butylene oxide per glucose unit has been used for substitution on the cellulose, and the reaction product thus obtained is then washed with water.

If a thermoplastic reaction product is to be produced, etherification with butylene oxide is continued until at least 1.8 moles of butylene oxide per glucose unit have been used for substitution on the cellulose. Advantageously, not more than 3.0 moles of butylene oxide should be used per glucose unit for the substitution, because it is one of the essential advantages of the present process that, at the reaction conditions employed, water-insoluble etherification products are obtained even at a relatively low degree of substitution with butylene oxide.

The alkali cellulose employed in the process of the present invention may be prepared in the customary manner, by immersion of cellulose in an aqueous alkali hydroxide solution and squeezing off of excess liquor after standing for some time (e.g. 6 to 24 hours). Advantageously, a pulverized cellulose with cellulose fibers of less than 0.3 mm. length is used as the starting material, and alkalization is effected by means of a liquor containing 0.2 to 0.4 part by weight of NaOH and 0.8 to 1.3 parts by weight of water per part by weight of air-dried cellulose. Alkalization preferably is effected in a vessel provided with a stirrer. When the soda lye is used in the quantities stated, no alkali liquor need be squeezed off or otherwise removed from the cellulose before etherification with butylene oxide.

Etherification is effected in a pressure vessel, which is advantageously equipped with a stirrer. 1,2-butylene oxide in a quantity which corresponds to at least 4 times the weight of the cellulose, preferably to 5 to 10 times the weight of the cellulose, is charged into the pressure vessel in which etherification is effected. Normally, the etherification process is conducted at temperatures ranging from 60° to 90° C. The duration of the etherification reaction depends in particular upon the etherification temperature employed and the desired degree of molecular substitution. At an etherification temperature of 60° C., a desired degree of molecular substitution of 0.7 is attained within about 2 hours. In order to reach a degree of molecular substitution of 3.0, an etherification temperature of 90° C. must be maintained for about 24 hours. Preferably, an etherification temperature of 75° to 80° C. is maintained for an etherification time of from 4 to 20 hours.

Etherification may be performed in the presence of an organic solvent or diluent. This may be either water-soluble or water-insoluble, such as acetone or isopropanol, or ligroin. Etherification processes conducted in the absence of organic solvents or diluents lead to an accelerated and, as regards the butylene oxide used, more extensive etherification and are, therefore, preferred.

The etherification products obtained are not soluble or swellable in hot or cold water. After the etherification process is completed, the cellulose ether produced is separated by filtration and washed with water. A reaction product is thus obtained which is free or substantially free from water-soluble components. During washing with water, not only the alkali hydroxide, but also all or substantially all of the butylene glycols formed as by-products of the etherification reaction are removed, insofar as they are soluble in water. The cellulose ether washed in this manner may be used for many purposes. It still contains, however, substantial amounts of impurities, e.g. from 10 to 20 per cent by weight, most of them being polybutylene glycols. They may act as plasticizers for the cellulose ether, but are often undesirable. They are advantageously removed by washing with a light petroleum ether, preferably with ligroin (a special kind of gasoline) having a boiling range from 100° to 140° C., but other light petroleum fractions with boiling ranges between 40° and 200° C. also may be used for washing.

By the process of the present invention, a cellulose ether, in particular a thermoplastic cellulose ether, may be completely or partially liberated from water-soluble impurities by a simple washing with water of any desired temperature. Further, it is possible by the process of the invention to produce a cellulose ether which is substantially free from impurities, by washing with gasoline. The cellulose ethers are soluble in many organic solvents and may be used in various applications. Alone or in combination with other plastic substances, they may be used, e.g., for the production of plastic films, as binders in lacquers, or as a water-insoluble size.

The invention will be further illustrated by the following specific examples:

EXAMPLE 1

86 parts by weight of finely ground pinewood sulfite cellulose (corresponding to 0.5 mole of glucose per unit of weight) are alkalized in the customary manner in a mixing vessel with 24 parts by weight of NaOH dissolved in 90 parts by weight of water. The entire alkalization mixture is then poured into an autoclave provided with a stirrer. After adding 500 parts by weight of 1,2-butylene oxide of a commercial degree of purity (boiling point: 62° to 64.5° C.), the mixture is etherified for 20 hours at a temperature of 80° C. In the beginning of the reaction, there is a superatmospheric pressure of 1.5 to 1.8 atmospheres absolute in the apparatus, which drops to approximately atmospheric pressure after some hours.

After completion of the etherification reaction, the honeycolored mass thus obtained which, in addition to the hydroxy butyl cellulose formed, consists of polybutylene gylcols, unreacted butylene oxide, and alkali, is neutralized by means of an acid, e.g. hydrochloric acid or acetic acid, and then repeatedly washed with cold or hot water while it is in a very finely divided form. By this operation, most of the polybutylene glycols formed are removed together with the alkali hydroxide.

However, 10 to 20 per cent of impurities are tenaciously retained by the product, and are extracted with ligroin or a special type of gasoline (boiling point 100° to 140° C.) after the product has been dried and crushed. The product thus obtained is in the form of white granules which can be easily pulverized after drying.

A gas-chromatographic analysis of the polybutylene glycols extracted with ligroin yielded the following data (per cent is by weight):

| | |
|---|---|
| 40 to 50 per cent | of tributylene glycol |
| approx. 20 per cent | of tetrabutylene glycol |
| 5 to 10 per cent | of dibutylene glycol |
| approx. 2 per cent | of monobutylene glycol |
| remainder: | butylene oxide and higher molecular weight polybutylene glycols. |

The pure hydroxy butyl cellulose thus obtained had a molecular substitution degree of 2.10, corresponding to 49.5 per cent of $OC_4H_8$ groups, determined by the Zeisel-Morgan method (see Ind. Eng. Chem. Analyt. Ed. 18, 1946, 500) and dissolved readily in a great variety of organic solvents, e.g. aliphatic alcohols, cyclohexanone, tetrahydrofuran, dimethyl sulfoxide, chloroform, benzene, glacial acetic acid, a mixture of 70 per cent by volume of methylene chloride and 30 per cent by volume of methanol, and others.

In other solvents, e.g. acetone, methylene chloride, or ether, an intensive swelling or even dissolution takes place. In petroleum ether (or ligroin), the hydroxy butyl cellulose is insoluble, the same as in water.

When measuring the viscosity in a mixture of 70 per cent by volume of methylene chloride and 30 per cent by volume of methanol by the falling-ball method of Hoeppler, a viscosity of 25 cp was found for a 2 per cent solution at 20° C.

The dried, purified product possessed thermoplastic properties. Its yield point was at 178° C.; its decomposition point at 252° C. (an apparatus with a copper block was used for determining the melting point).

EXAMPLE 2

Alkali cellulose of the following composition:
1.00 part by weight of cellulose,
0.33 part by weight of NaOH, and
1.05 parts by weight of water
was etherified as described in Example 1, after 5.8 parts by weight of 1,2-butylene oxide had been added, and the product obtained was purified as described in the preceding example. The hydroxy butyl cellulose thus produced had a molecular substitution degree of 2.68, a yield point of about 208° C., and a decomposition temperature of about 260° C.

EXAMPLE 3

An alkali cellulose of the following composition:
86 parts by weight of cellulose,
28 parts by weight of NaOH, and
90 parts by weight of water was etherified after 360 parts by weight of butylene oxide and 580 parts by weight of acetone had been added, and the cellulose ether thus produced was purified as described in Example 1.

The reaction time was 7 hours, and the reaction temperature 75° C.

The purified product had the following characteristics:

Molecular substitution degree: 0.74
Decomposition Temperature: 240° C. (approx.)

EXAMPLE 4

An alkali cellulose of the following composition:
86 parts by weight of cellulose,
28 parts by weight of NaOH, and
90 parts by weight of water
was mixed with
720 parts by weight of butylene oxide and
500 parts by weight of ligroin,
and etherified as described in Example 1.

The reaction time was 7 hours; the reaction temperature was 75° C.

After washing with water and ligroin as described in Example 1, the product had the following characteristics:

Molecular Substitution Degree: 1.91
Yield Point: 215° C. (approx.)
Decomposition Temperature: 235° C. (approx.)

It will be obvious to those skilled in the art that many modifications may be made within the scope of the present invention without departing from the spirit thereof, and the invention includes all such modifications.

What is claimed is:

1. A process for the preparation of hydroxy butyl cellulose which comprises etherifying alkali cellulose in a single stage with butylene oxide in a quantity corresponding to at least four times the weight of cellulose present in the form of alkali cellulose, at a temperature of at least 60°C, continuing the reaction until 1.8 to 3.0 moles of butylene oxide per glucose unit have been used for substitution on the cellulose, and washing the reaction product with water.

* * * * *